United States Patent [19]

Walsh et al.

[11] Patent Number: 5,524,663
[45] Date of Patent: Jun. 11, 1996

[54] VACUUM TUBE SHUT-OFF FOR POWER TOOLS

[75] Inventors: Rodman Walsh, Wayne, Pa.; Duane T. Bloemke, Virginia Beach, Va.

[73] Assignee: Unique Systems, Inc., Lansing, Ill.

[21] Appl. No.: 353,509

[22] Filed: Dec. 9, 1994

[51] Int. Cl.⁶ ............... F16K 3/30; F16K 3/312; F16K 51/00
[52] U.S. Cl. .............. 137/15; 137/315; 137/317; 137/883; 138/94.3; 251/326; 251/900
[58] Field of Search ................ 137/15, 317, 318, 137/315, 883; 251/326, 327, 900; 138/94, 94.3, 97, 99

[56] References Cited

U.S. PATENT DOCUMENTS

| 1,054,103 | 2/1913 | Force | 138/94.3 |
|---|---|---|---|
| 1,311,332 | 7/1919 | Edwards | 138/94.3 |
| 1,750,485 | 3/1930 | Muller, Jr. | 137/883 |
| 1,851,065 | 3/1932 | Roselle | 251/326 |
| 1,998,830 | 4/1935 | Beebe | 137/883 |
| 2,271,282 | 1/1942 | Young | 138/94.3 |
| 2,340,499 | 2/1944 | Zachow | 251/167 |
| 3,051,201 | 8/1962 | Wilson | 138/94.3 |
| 3,749,108 | 7/1973 | Long | 137/15 |
| 3,860,038 | 1/1975 | Forni | 138/94.3 |
| 3,864,106 | 2/1975 | Brandt | 55/288 |
| 3,948,282 | 4/1976 | Yano | 137/318 |
| 3,956,137 | 5/1976 | Dempsey | 137/883 |
| 4,043,534 | 8/1977 | Gottshall | 251/174 |
| 4,194,721 | 3/1980 | Nachtigahl | 251/326 |
| 4,208,201 | 6/1980 | Rueck | 65/27 |
| 4,213,477 | 7/1980 | Velasquez | 137/318 |
| 4,214,608 | 7/1980 | Mailliet et al. | 251/326 |
| 4,270,559 | 6/1981 | Wallberg | 137/318 |
| 4,332,271 | 6/1982 | Rohr | 137/315 |
| 4,951,346 | 8/1990 | Salmon | 15/322 |
| 4,977,638 | 12/1990 | Best | 15/301 |
| 5,050,628 | 9/1991 | Ripley et al. | 137/315 |
| 5,170,813 | 12/1992 | Francis | 137/15 |
| 5,271,602 | 12/1993 | Funaba | 251/335.3 |

FOREIGN PATENT DOCUMENTS 0210476  6/1984  Germany ..................... 251/327

*Primary Examiner*—George L. Walton
*Attorney, Agent, or Firm*—Wallenstein & Wagner, Ltd.

[57] ABSTRACT

The present invention provides a vacuum tube shut-off 10 for shutting off vacuum air flow between coating removal power tools 36 and a vacuum source 34. The vacuum tube shut-off 10 includes a vacuum tube 12 in vacuum air flow communication with the power tool 36 and the vacuum source. The vacuum tube 12 has a slot 26 transverse to the air flow direction through the vacuum tube 12. An air flow block 16 is removably insertable into the vacuum tube 12 through the slot 26 to prevent air flow through the vacuum tube 12. A self clamping stopper or O-ring 14 circumscribes the outside of the vacuum tube 12 to sealingly engaging the vacuum tube 12 to prevent air flow through the slot 26 when the air flow block 16 is removed from the slot 26.

21 Claims, 2 Drawing Sheets

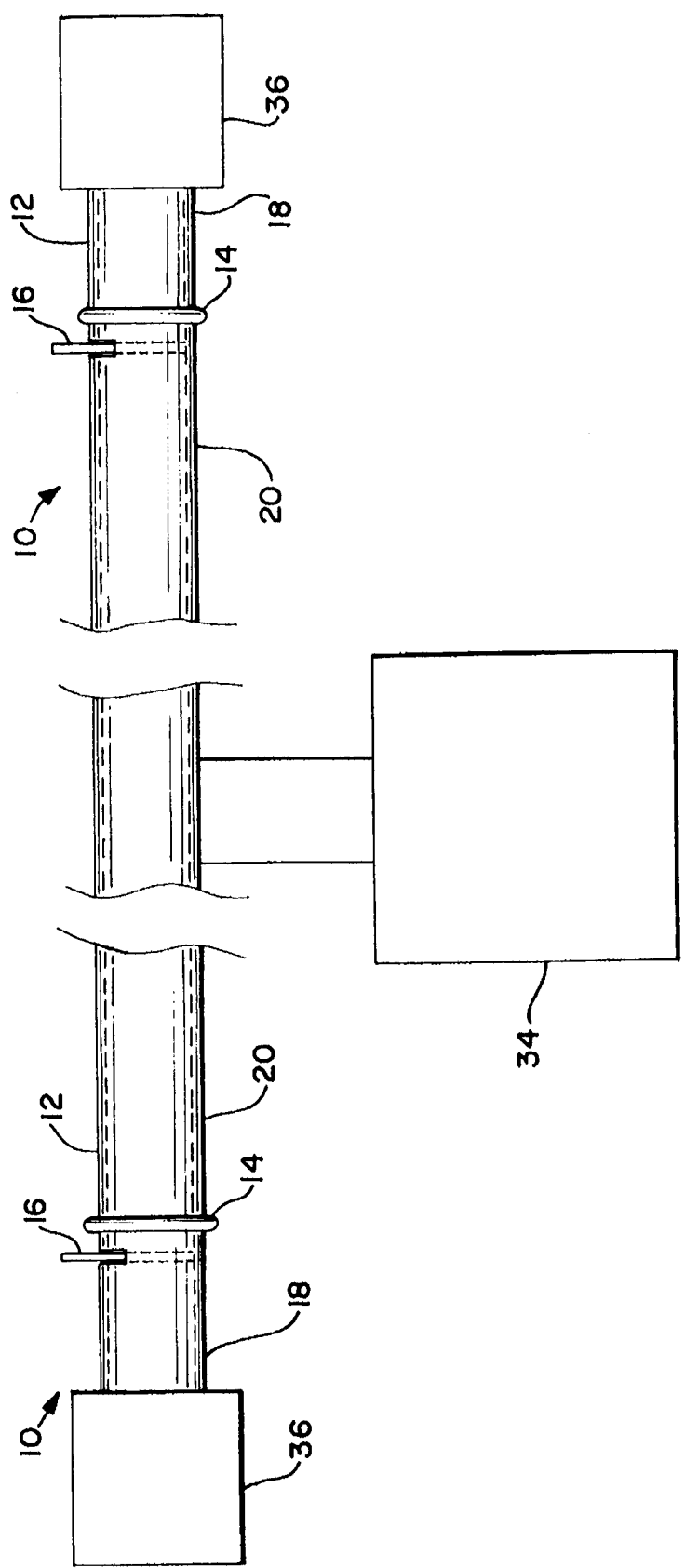

VACUUM TUBE SHUT-OFF FOR POWER TOOLS

FIELD OF THE INVENTION

The present invention is generally directed to hand held power tool coating removal equipment. More specifically, the present invention is directed to vacuum tube shut-offs for power tool coating removal equipment.

BACKGROUND OF THE INVENTION

Steel and concrete, for example, are two materials commonly used in the construction industry. Frequently, structures built from concrete, steel, or other materials have a coating applied to the surface of the construction material. The surface coatings may include paints, corrosion inhibitors, or surface sealers, for example. After a surface coating is applied to the material surface, the coating cannot be efficiently removed without the aid of power tool coating removal equipment.

Coating removal equipment is power assisted because manually removing a surface coating is prohibitively time consuming and expensive. Unique Systems, Inc., Lansing, Ill. manufactures power tool coating removal equipment. Surface coatings are removed to prepare the surface for additional operations, such as re-finishing with paint. During removal of a surface coating, dust, particulates, or contaminates may be generated and released into the work area. The particulates may be generated from the surface coating and the underlying material surface when the power tool is utilized to remove the coating.

Existing power tool coating removal equipment provides for removal of particulates generated during a coating removal process. Vacuum lines, for example, have been connected from a vacuum source to existing power tool coating removal equipment to collect and remove the particulates from the work area. The vacuum lines draw in air and particulates from the power tools so that the particulates are not released into the work area. The power tools are equipped with a brush to improve sealing power of the tool against the material surface to inhibit particulates from escaping from the tool into the work area.

Preventing particulates from escaping into the work area is important to provide a clean and safe working environment. However, existing power tool coating removal equipment connected to a vacuum source may exhibit problems. Particularly, multiple power tools may be connected to a common vacuum source. When one power tool is not in use, there is unrestricted air flow from that tool. This results in reduced effectiveness for the remaining tools as a higher percentage of the air flow and vacuum goes to the idle tool. This problem is compounded when more than one power tool is idle.

Therefore, a need exists to improve power tool coating removal equipment. More specifically, there is a need to improve vacuum removal of particulates when removing a coating from a material surface with a power tool. The present invention is provided to solve these and other problems.

SUMMARY OF THE INVENTION

The present invention provides a vacuum tube shut-off for shutting off vacuum air flow between coating removal power tools and a vacuum source. The vacuum tube shut-off includes a vacuum tube in vacuum air flow communication with the power tool and the vacuum source. The vacuum tube has a slot transverse to the air flow direction through the vacuum tube. An air flow block is removably insertable into the vacuum tube through the slot to prevent air flow through the vacuum tube. A self clamping stopper or O-ring circumscribes the outside of the vacuum tube to sealingly engaging the vacuum tube to prevent air flow through the slot when the air flow block is removed from the slot.

BRIEF DESCRIPTION OF THE DRAWINGS

FIG. 6 is a diagram showing the shut-off in use with a vacuum source and power tools.

DETAILED DESCRIPTION OF PREFERRED EMBODIMENTS

Although the present invention can be made in many different forms, the preferred embodiments are described in this disclosure and shown in the attached drawings. This disclosure exemplifies the principles of the present invention and does not limit the broad aspects of the invention only to the illustrated embodiments.

Figure 1:
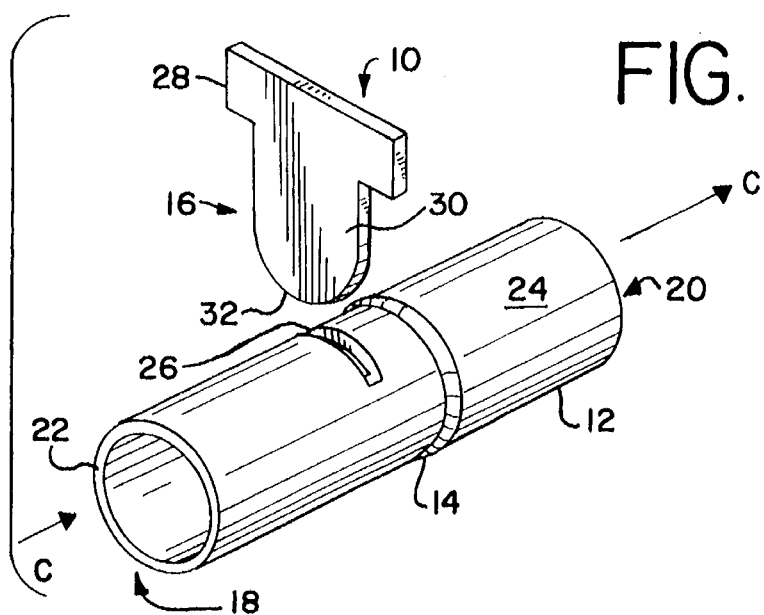
FIG. 1 is a perspective view of a vacuum tube shut-off made in accordance with the principles of the present invention.

FIG. 1 shows a perspective view of a vacuum tube shut-off 10 made in accordance with the principles of the present invention. The vacuum tube shut-off 10, also termed a valve, includes a vacuum tube 12, an O-ring 14, and an air block 16.

Figure 3:
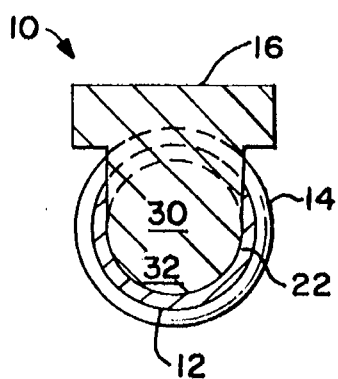
FIG. 3 is a cross-sectional view of FIG. 2 along the line 3—3.
Figure 5:
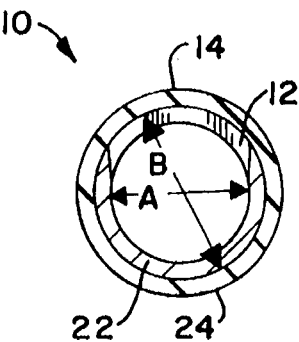
FIG. 5 is a cross-sectional view of FIG. 4 along the line 5—5.

The vacuum tube 12 has a tool end 18 and a vacuum end 20. Of course, the vacuum end 20 is connected to a vacuum source 34 and the tool end 18 is connected to a coating removal power tool 36. There may be multiple coating removal power tools 36 such that each tool has a corresponding vacuum tube 12. The multiple vacuum tubes 12 may all be connected to a single, common vacuum source 34. The end view of FIG. 1 and the cross-sectional views of FIGS. 3 and 5 show the vacuum tube 12 as a round or circular tube. Although, the vacuum tube 12 can be made from any conduit having any cross-sectional shape. For example, the vacuum tube 12 may have a square shape in cross-section.

Referring to the cross-sectional view shown in FIG. 5, the vacuum tube 12 has an inside diameter A, a wall 22 having a thickness, and an outside diameter B which defines an outside surface 24. The size of the inside diameter A of the vacuum tube 12 is selected to allow adequate air flow and particulate passage from the power tool 36 through the vacuum tube 12 to the vacuum source 28. Accordingly, air under vacuum pressure and particulates can flow through the vacuum tube 12 in a flow direction C shown by the accompanying arrow in FIG. 1. If the air flow through the vacuum tube 12 is reversed to blow air out of the tool end then the flow direction would be reversed.

Referring to FIG. 1, the vacuum tube 12 provides a slot 26 through a portion of the vacuum tube 12. Preferably, the slot 26 is located nearer the coating removal tool than the vacuum source to allow a tool operator to easily operate the vacuum tube shut-off 10. The slot 26 is orientated transverse to the flow direction C and extends through the wall 22 of the vacuum tube 12. The slot 26 is arcuately shaped as shown in FIGS. 1 and 3 due to the circular cross-sectional shape of the vacuum tube 12. The slot 26 extends along an arcuate path less than 180° and permits the insertion of the air block 16 to completely block off the inside to diameter A of the vacuum tube 12 as described below. Alternately, the slot 26 may extend through an arcuate path of approximately 180°.

FIG. 1 shows a perspective view of the air block 16. The air block 16 includes a handle 28 and a partition 30 which extends from and opposite to the handle 28. The partition 30 has an end 32 that has a shape which corresponds to the inside shape of the vacuum tube 12. As shown in FIGS. 1 and 3, the end 32 of the partition 30 has a rounded shape that matches the inside diameter A of the vacuum tube 12. The handle 28 provides a portion of the air block 16 which can be grasped by an operator to insert the air block 16 into or remove the air block 16 from the vacuum tube slot 26.

Figure 2:
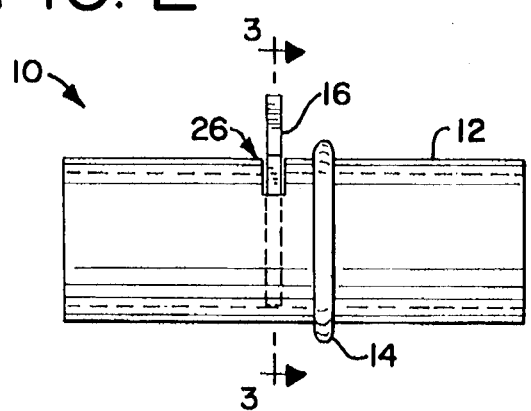
FIG. 2 is a side elevational view of the vacuum tube shut-off of FIG. 1 showing the shut-off in the OFF position.

FIG. 2 shows the air block 16 inserted into the slot 26 of the vacuum tube 12. In this position, the vacuum tube shut-off 10 is in an OFF position, and air is prevented from flowing through the vacuum tube 12. In the OFF position, the O-ring 14 can be positioned on either side of the air block 16. FIG. 3 shows the air block 16 inserted into the slot 26 to block the air flow through the vacuum tube 12. More specifically, the partition 30 is inserted through the slot 26 and abutted against the inside of the wall 22 of the vacuum tube 12. The partition 30 prevents air from flowing around the partition 30 because the rounded shape of the partition end 32 coincides with or matches the inside circular shape of the vacuum tube 12.

Referring back to FIG. 2, the air block 16 is shown with a thickness that is less than the width of the slot 26. An air block 16 that is relatively thin compared to the slot width may provide a space between the air block 16 and the vacuum tube wall 22. However, the vacuum pressure will tend to pull the air block 16 against the vacuum tube wall 22 to eliminate that space on the vacuum side of the air block 16. Accordingly, the air block 16 prevents air from flowing through the slot 26 and into the vacuum tube 12.

Figure 4:
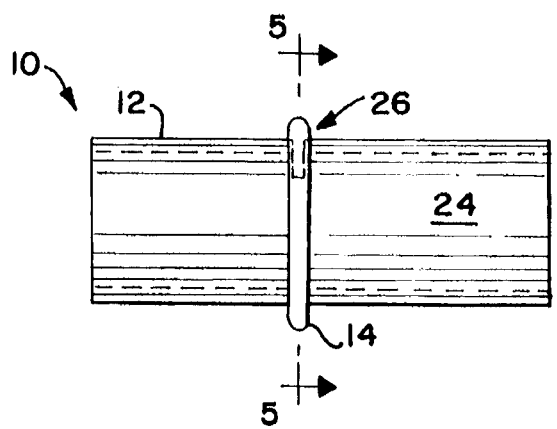
FIG. 4 is a side elevational view of the vacuum tube shut-off of FIG. 1 showing the shut-off in the ON position.

The O-ring 14 is provided to seal the slot 26 when the air block 16 is removed from the slot 26 as shown in FIGS. 4 and 5. In this position the vacuum tube shut-off 10 is in an ON position, and air can flow through the vacuum tube 12. The O-ring 14 may also be termed a stopper. The O-ring 14 is made from a resilient, elastic material. The O-ring 14 circumscribes the outside of the vacuum tube 12 and is in contact with the outside surface 24 of the vacuum tube 12. The O-ring 14 has an inside diameter and an outside diameter. In a relaxed state, the O-ring 14 inside diameter is less than the outside diameter B of the vacuum tube 12. However, when the O-ring 14 is positioned on the outside of the vacuum tube 12, the O-ring 14 is stretched to accommodate the relatively larger vacuum tube outside diameter B. Because the resilient O-ring 14 is stretched, the O-ring 14 is biased to return to its non-stretched state. Accordingly, the O-ring 14 imparts a self-clamping force to constrict the O-ring 14 around the vacuum tube 12.

The O-ring 14 has a thickness which is greater than the width of the slot 26. When the air block 16 is removed from the slot 26, the O-ring 14 is slid over the slot 26 as described below in operation of the vacuum tube shut-off 10. The self-clamping force of the O-ring 14 forces the O-ring 14 against the edges of the slot 26 to seal the slot 26 closed. Air cannot flow through the sealed slot 26 from outside the vacuum tube 12 into the vacuum tube 12. Thus, the O-ring 14 prevents unrestricted air flow through the slot 26 into the vacuum tube 12 when the air block 16 is removed and the power tool is in use.

The operation of the vacuum tube shut-off 10 is described where multiple power tools 36 are connected to a common vacuum source 34 through their respective vacuum tubes 12. Although, the vacuum tube shut-off 10 could be utilized on coating removal equipment where only one power tool is connected to a vacuum source. The operation of the vacuum tube shut-off 10 is described with the assumption that all of the power tool vacuum tube shut-offs 10 are in the OFF position as shown in FIGS. 2 and 3.

The vacuum source 34 is turned on to generate a vacuum pressure. Air attempts to flow from all of the power tools 36 through their respective vacuum tubes 12, as shown in FIG. 6 to the common vacuum source. However, all of the vacuum tubes 12 are blocked with their respective air blocks 16. A power tool operator removes the air block 16 from a power tool 36 and air under vacuum pressure begins to flow through that tool to the common vacuum source. The power tool operator slides the O-ring 14 on the outside of the vacuum tube 12 over the slot 26. The O-ring 14 covers the slot 26 and seals the slot 26 so that air cannot flow through the slot 26 into the vacuum tube 12. The vacuum tube shut-off 10 is now in the ON position as shown in FIGS. 4 and 5. The power tool operator engages the coating removal tool 36 with the material surface to begin removing the surface coating. The removed coating and resulting particulates are carried by the air flow away from the work area to a collection site for proper disposal. Additional power tool operators follow the same procedure in utilizing their coating removal tools 36 which results in the common vacuum source 34 providing air suction to multiple power tools.

When a coating removal tool operator stops utilizing the power tool, the operator places the air flow shut-off in the OFF position as shown in FIGS. 2 and 3. The operator slides the O-ring 14 off of the slot 26 in the vacuum tube 12 to expose the slot 26. The air block 16 is slid into the slot 26 to prevent air from flowing unrestricted through the vacuum tube 12. Preventing unrestricted air flow through the vacuum tube 12 when the vacuum tube shut-off 10 is in the OFF position ensures that the remaining coating removal tools still in use have sufficient vacuum air flow to remove particulates from the work area. Additional power tool operators can place their tools in the OFF position by following the same procedure.

While the preferred embodiments have been illustrated and described, numerous changes and modifications can be made without significantly departing from the spirit and scope of this invention. Therefore, the inventors intend that such changes and modifications be covered by the appended claims.

We claim:

1. An air flow valve comprising:

a conduit having a flow direction and an outside surface, the conduit defining a slot transverse to the flow direction;

an air flow block insertable into the conduit through the slot to prevent air flow through the conduit; and closure means at least partially circumscribing the outside surface and movable along a portion of outside surface for alternately opening the slot for insertion of the air flow block through the slot and into the conduit for blocking air flow through the conduit and closing the slot after removal of the air flow back from the conduit at the slot for allowing air flow to flow through the conduit.

2. The air flow valve of claim 1 wherein the conduit is a round tube having a tube inside diameter and a tube outside diameter.

3. The air flow valve of claim 2 wherein the closure means is an O-ring having an O-ring inside diameter that is smaller than the tube outside diameter.

4. The air flow valve of claim 3 wherein the O-ring has a cross-sectional diameter that is greater than a width of the slot.

5. The air flow valve of claim 1 wherein the air flow block comprises a partition extending from a handle, the partition having an end shaped to match an inside shape of the conduit, the partition insertable into the conduit through the slot to prevent air flow through the conduit.

6. The air flow valve of claim 2 wherein the slot is an arcuate slot.

7. The air flow valve of claim 6 wherein the slot extends through an angle of less than 180°.

8. The air flow valve of claim 6 wherein the slot extends through an angle of approximately 180°.

9. A vacuum tube shut-off for shutting off vacuum air flow between a power tool and a vacuum source, the vacuum tube shut-off comprising:

a vacuum tube in air flow communication with the power tool and the vacuum source; the vacuum tube having a wall and a slot through the wall;

a block removably inserted through the slot to shut off the air flow; and a stopper at least partially circumscribing an outside surface of the vacuum tube, the stopper being movable along the outside surface of the vacuum tube between a first position adjacent the slot to allow the block to be inserted through the slot into the vacuum tube for blocking air flow through the vacuum tube and to a second position covering the slot when the block is removed from the vacuum tube and the slot to allow air flow through the vacuum tube.

10. The air flow valve of claim 1 wherein the closure means comprises a resilient seal.

11. The vacuum tube shut-off of claim 9 wherein the slot is positioned closer to the power tool than to the vacuum source.

12. The vacuum tube of claim 9 wherein the vacuum tube is circular in cross-section.

13. The vacuum tube of claim 12 wherein the slot is an arcuate slot.

14. The vacuum tube of claim 13 wherein the slot extends through an angle of less than 180°.

15. The vacuum tube of claim 13 wherein the slot extends through an angle of approximately 180°.

16. The stopper of claim 9 wherein the stopper is a resilient O-ring that is self-clamping.

17. The O-ring of claim 16 wherein the O-ring has a cross-sectional diameter that is greater than a width of the slot.

18. The block of claim 9 wherein the block comprises a partition connected to a handle, the partition having an end shaped to match an inside shape of the vacuum tube, the partition inserted through the slot to prevent air flow through the vacuum tube.

19. A method of controlling air flow, under vacuum pressure comprising the steps of:

providing air flow through a tube having a slot transverse to the air flow and a stopper at least partially circumscribing the tube for plugging and unplugging the slot;

moving the stopper along an outside surface of the tube away from the slot to open the slot;

inserting an air flow block through the slot and into the tube after opening the slot;

stopping the air flow with the air flow block after being inserted into the tube;

removing the air flow block from the tube and the slot; and plugging the slot with the stopper to close the slot by moving the stopper along the outside surface of the tube, thereby permitting air to flow through the tube.

20. A method of selectively blocking a vacuum applied to a plurality of tools comprising the steps of:

providing a plurality of tools individually connected to a common vacuum source by vacuum tubes, each vacuum tube having an O-ring at least partially circumscribing the tube for covering and uncovering a slot in the tube;

applying vacuum pressure from the common vacuum source to the tools;

flowing air under vacuum pressure from the tools to the vacuum source;

selecting a tool in which to block the air flow;

moving the O-ring on an outside surface of the vacuum tube connected to the selected tool away from the slot to uncover the slot;

inserting a block into the vacuum tube through the slot after uncovering the slot; and blocking the air flow to the selected tool with the block after being inserted into the vacuum tube.

21. The method of claim 20 further comprising the steps of:

removing the block from the slot and the vacuum tube connected to the selected tool;

sealing the slot by moving the O-ring on the outside of the vacuum tube to cover the slot; and flowing air under vacuum pressure from the selected tool through the vacuum tube to the vacuum source.

\* \* \* \* \*